US012026175B1

(12) United States Patent
Singh et al.

(10) Patent No.: US 12,026,175 B1
(45) Date of Patent: Jul. 2, 2024

(54) AUTOMATED LATENCY-AWARE PURGING OF DATABASE RECORDS

(71) Applicant: FMR LLC, Boston, MA (US)

(72) Inventors: Pankaj Kumar Singh, Cary, NC (US); Kinjal Desai, Apex, NC (US); Midhun Gandhi Thiagarajan, Rasipuram (IN)

(73) Assignee: FMR LLC, Boston, MA (US)

(*) Notice: Subject to any disclaimer, the term of this patent is extended or adjusted under 35 U.S.C. 154(b) by 0 days.

(21) Appl. No.: 18/086,912

(22) Filed: Dec. 22, 2022

(51) Int. Cl.
*G06F 16/27* (2019.01)
*G06F 11/34* (2006.01)
*G06F 16/23* (2019.01)

(52) U.S. Cl.
CPC .......... *G06F 16/27* (2019.01); *G06F 11/3409* (2013.01); *G06F 16/2365* (2019.01)

(58) Field of Classification Search
CPC ... G06F 16/27; G06F 11/3409; G06F 16/2365
USPC ........................................................ 707/634
See application file for complete search history.

(56) References Cited

U.S. PATENT DOCUMENTS

| | | | |
|---|---|---|---|
| 10,783,125 B2 | 9/2020 | Bester et al. | |
| 11,188,507 B2 | 11/2021 | Jaiswal et al. | |
| 2018/0067972 A1* | 3/2018 | Jaiswal | G06F 16/215 |
| 2018/0129687 A1* | 5/2018 | Bester | G06F 16/215 |

* cited by examiner

*Primary Examiner* — Michael Pham
(74) *Attorney, Agent, or Firm* — Cesari & McKenna, LLP

(57) ABSTRACT

Methods and apparatuses are described for automated latency-aware purging of database records. A server determines a synchronization latency between a storage database and an online transaction processing (OLTP) database. When the synchronization latency is below a predetermined threshold, the server identifies a first database object in the OLTP database and selects database records to be purged from the first database object based upon a data purge instruction set. The server identifies a second database object in the storage database that corresponds to the first database object and selects database records in the second database object based upon the data purge instruction set. The server purges the database records from the first database object in the OLTP database when a characteristic of the database records to be purged from the first database object matches a characteristic of the database records selected in the second database object.

26 Claims, 4 Drawing Sheets

AUTOMATED LATENCY-AWARE PURGING OF DATABASE RECORDS

TECHNICAL FIELD

This application relates generally to methods and apparatuses, including computer program products, for automated latency-aware purging of database records.

BACKGROUND

For certain types of large-scale computing applications, such as complex trading platforms that rely on time series data and where fractions of a second can have major impact on a transaction, it is important to utilize database technology that can perform very fast and low-latency transaction processing. An example of such database technology is an online transaction processing (OLTP) database infrastructure that can be optimized for receiving, processing, and storing large amounts of structured data in real time. A typical OLTP database infrastructure may comprise one or more physical databases and may consolidate various capabilities on the same database as much as possible to support strong transaction consistency use cases. In addition, the OLTP database may be configured to limit data retention only as needed to support its capabilities. As such, it is important to enable periodic data purge processes for OLTP databases to ensure that the databases can always perform optimally without storing unnecessary data that may slow down transaction processing. However, it may be equally important to store a replicated or archival copy of data stored in an OLTP database. For example, governmental regulations may require that organizations maintain an immutable copy of such OLTP data. In another example, the organization may want to ensure that the OLTP data is archived and maintained in a separate repository for execution of database queries against the OLTP data that do not impact the low-latency processing of the OLTP infrastructure.

To address each of these concerns, the organization may configure a storage database that is coupled to the OLTP database via a synchronization framework, so that data in the OLTP database is periodically replicated to the storage database. Once replicated to storage, the data records can be safely deleted from the OLTP database. Generally, the synchronization framework can instantiate a data stream from the OLTP database to the storage database, which transfers applicable data from a database object or objects in the OLTP database to corresponding database object(s) in the storage database. As can be appreciated, due to a variety of factors, the synchronization process may involve some latency between when a given record is transmitted from the OLTP database and when the record is received and stored in the storage database. Due to this latency, the initiation and management of such data purge processes requires careful monitoring of data synchronization from OLTP to storage, to both ensure that the data transfer is complete and that the data copied to the storage database matches the data in the OLTP database, prior to purging any data from the OLTP database. Failure to carefully manage the data purge process can result in irrecoverable data loss, which can impact the integrity of the OLTP database.

SUMMARY

Therefore, what is needed are methods and systems for automatically configuring, initiating, and managing data purging from transactional database instances (such as OLTP database instances) to avoid data loss and confirm the integrity, completeness, and accuracy of OLTP data that is replicated to a storage database instance. The techniques described herein advantageously provide for latency-aware database purging, such that a data purge process can be stopped prior to deletion of records if the synchronization latency between the OLTP database and the storage database does not satisfy a threshold value. In addition, the methods and systems described herein beneficially provide for integrity checks on the data to be purged to ensure full data replication has occurred and the data matches between database instances prior to purging.

The invention, in one aspect, features a system for automated latency-aware purging of database records. The system comprises a server computing device having a memory for storing computer-executable instructions and a processor that executes the computer-executable instructions. The server computing device establishes a connection to a storage database instance. The server computing device determines a data synchronization latency value between the storage database instance and an online transaction processing (OLTP) database instance coupled to the storage database instance. When the data synchronization latency value is below a predetermined threshold value, the server computing device establishes a connection to the OLTP database instance. The server computing device identifies a first database object in the OLTP database instance and select database records to be purged from the first database object based upon a data purge instruction set. The server computing device identifies a second database object in the storage database instance that corresponds to the first database object and select database records in the second database object based upon the data purge instruction set. The server computing device purges the database records from the first database object in the OLTP database instance when a characteristic of the database records to be purged from the first database object matches a characteristic of the database records selected in the second database object.

The invention, in another aspect, features a computerized method of automated latency-aware purging of database records. A server computing device establishes a connection to a storage database instance. The server computing device determines a data synchronization latency value between the storage database instance and an online transaction processing (OLTP) database instance coupled to the storage database instance. When the data synchronization latency value is below a predetermined threshold value, the server computing device establishes a connection to the OLTP database instance. The server computing device identifies a first database object in the OLTP database instance and select database records to be purged from the first database object based upon a data purge instruction set. The server computing device identifies a second database object in the storage database instance that corresponds to the first database object and select database records in the second database object based upon the data purge instruction set. The server computing device purges the database records from the first database object in the OLTP database instance when a characteristic of the database records to be purged from the first database object matches a characteristic of the database records selected in the second database object.

Any of the above aspects can include one or more of the following features. In some embodiments, when the data synchronization latency value is above the predetermined threshold, the server computing device closes the connection to storage database instance and transmits a notification to a remote computing device. In some embodiments, the OLTP database instance and the storage database instance comprise instances of the same database. In some embodiments, the first database object comprises a first table and the database records to be purged from the first database object comprise rows in the first table. In some embodiments, the second database object compromises a second table that corresponds to the first table and the database records in the second database object comprise rows in the second table.

In some embodiments, the data purge instruction set comprises an identifier of the first database object and one or more conditions that define the rows in the first database object to be purged. In some embodiments, the characteristic of the database records to be purged from the first database object comprises a count of the database records to be purged. In some embodiments, the count of the database records to be purged from the first database object is dynamically established based upon one or more selection criteria as defined in a configuration object. In some embodiments, the characteristic of the database records selected in the second database object comprises a count of the database records to be purged. In some embodiments, the count of the database records to be purged from the second database object is dynamically established based upon one or more selection criteria as defined in a configuration object.

In some embodiments, purging the database records from the first database object in the OLTP database instance comprises executing a database script that deletes from the first database object the database records to be purged. In some embodiments, the data synchronization latency value relates to a time delay between a first time at which a database record is written to the OLTP database instance and a second time at which a matching database record is written to the storage database instance. In some embodiments, the threshold value is one minute.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 3 is a diagram of an exemplary user interface displayed to a user of client computing device for entry of input for generation of a data purge instruction set.

FIG. 4 is a diagram of OLTP database instance and storage database instance before and after the data purge process.

DETAILED DESCRIPTION

Figure 1:
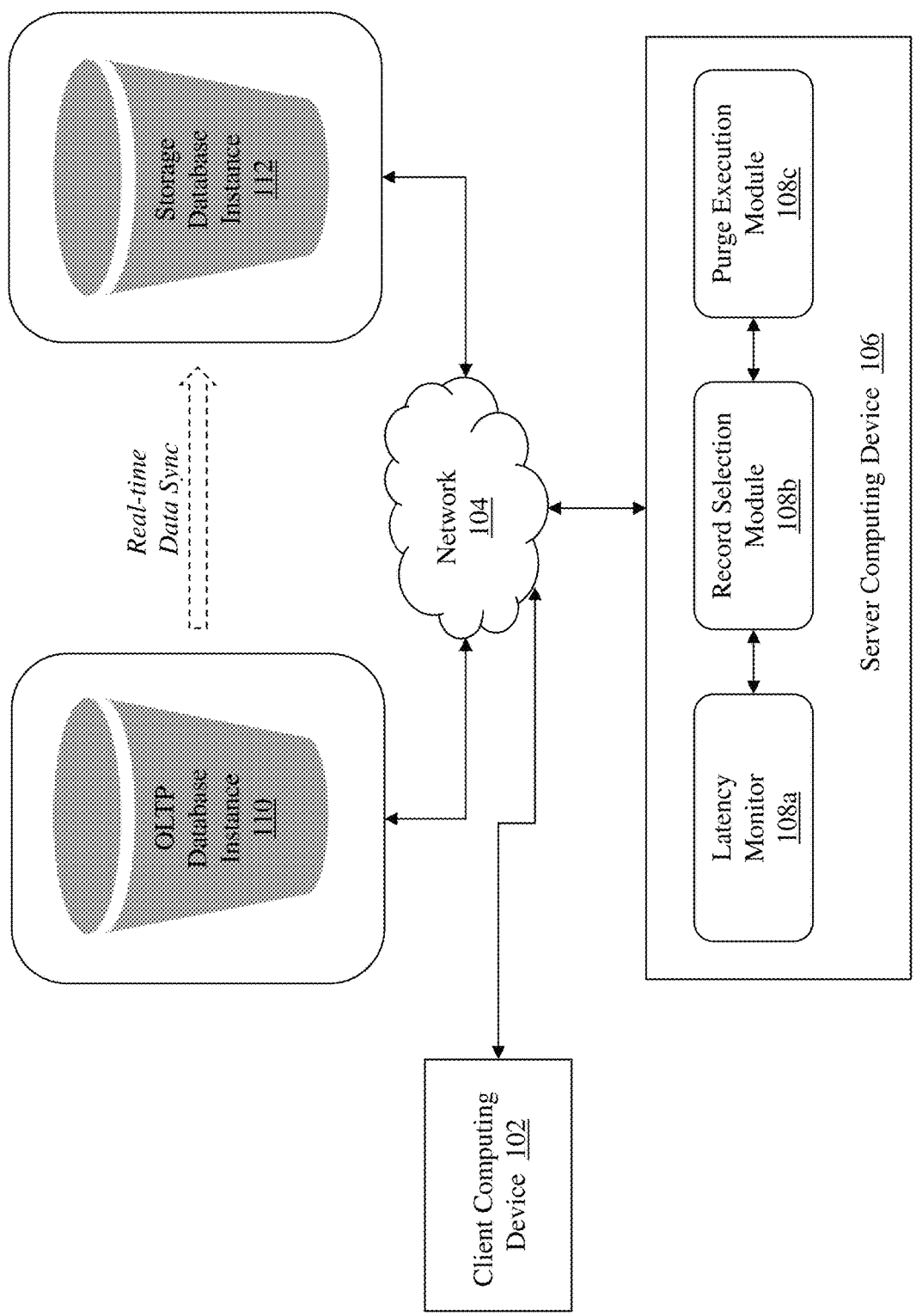
FIG. 1 is a block diagram of a system for automated latency-aware purging of database records.

FIG. 1 is a block diagram of a system for automated latency-aware purging of database records. System 100 includes client computing device 102, communications network 104, server computing device 106 that includes latency monitor 108a, record selection module 108b and purge execution module 108c, online transaction processing (OLTP) database instance 110 and storage database instance 112.

Client computing device 102 connects to one or more communications networks (e.g., network 104) in order to communicate with server computing device 106 to provide input and receive output relating to automated latency-aware purging of database records as described herein. Exemplary client computing devices 102 include but are not limited to desktop computers, laptop computers, tablets, mobile devices, smartphones, web application servers, cloud-based computing systems, database management platforms, software-as-a-service (SaaS) platforms, sysadmin control devices, and the like. It should be appreciated that other types of computing devices that are capable of connecting to the components of system 100 can be used without departing from the scope of invention. Although FIG. 1 depicts a single client computing device 102, it should be appreciated that system 100 can include any number of client computing devices.

Communication network 104 enables client computing device 102 to communicate with server computing device 106 and enables server computing device 106 to communicate with OLTP database instance 110 and storage database instance 112. Network 104 is typically a wide area network, such as the Internet and/or a cellular network. In some embodiments, network 104 is comprised of several discrete networks and/or sub-networks (e.g., cellular to Internet). In some embodiments, network 104 can be part of the same overall network topography to enable server computing device 106 to connect to client computing device 102 and/or database instances 110 and 112 using the same network.

Server computing device 106 is a device including specialized hardware and/or software modules that execute on a processor and interact with memory modules of server computing device 106, to receive data from other components of system 100, transmit data to other components of system 100, and perform functions for synchronization of metadata between databases in a cloud computing environment as described herein. As mentioned above, server computing device 106 includes latency monitor 108a, record selection module 108b and purge execution module 108c. In some embodiments, modules 108a-108c are specialized sets of computer software instructions programmed onto one or more dedicated processors in the server computing device.

Although modules 108a-108c are shown in FIG. 1 as executing within the same server computing device 106, in some embodiments the functionality of modules 108a-108c can be distributed among one or a plurality of other computing devices that are coupled to the server computing device 106. It should be appreciated that any number of computing devices, arranged in a variety of architectures, resources, and configurations (e.g., cluster computing, virtual computing, cloud computing) can be used without departing from the scope of the invention. The functionality of the modules 108a-108c will be described in greater detail throughout this specification.

OLTP database instance 110 and storage database instance 112 are data warehouses that store data associated with one or more enterprises and/or applications. In some embodiments, database instances 110 and 112 reside in a cloud-based computing framework comprised of one or more computing devices coupled to network 104. Exemplary data warehouse platforms include, but are not limited to, Amazon® Redshift™ available from Amazon, Inc.; Microsoft® Azure™ available from Microsoft Corp.; Oracle® Cloud Infrastructure™ (OCI) available from Oracle Corp.;

Google® BigQuery™ available from Google, Inc.; and Snowflake™ Data Cloud available from Snowflake, Inc. Generally, OLTP database instance 110 stores data relating to a real-time transaction processing application, while storage database instance 112 stores data for archival and redundancy purposes. As can be appreciated, OLTP database instance 110 is configured for processing fast, small, granular level queries to support data operations (e.g., reads, writes, updates) that need to be performed in real time. To optimize this type of performance, it is beneficial for OLTP database instance 110 to have minimal data retention to limit the size of instance 110 which can improve processing speed and efficiency. Storage database instance 112 is configured for processing queries to support data reads across domains, for use cases that can tolerate replication lag. Typically, storage database instance 112 comprises a data store that supports operational capabilities integrated from multiple transactional data stores, master data management (MDM), and other internal or external sources. It should be appreciated, however, that the techniques and advancements described herein are not solely limited to OLTP databases. Instead, these improvements can be applied to other types of databases, including heterogeneous source databases and other data repositories.

In some embodiments, database instances 110 and 112 are connected together via a synchronization framework (such as a Change Data Capture (CDC) Replication process). The synchronization framework is a software process that operates to detect when changes are made to data in OLTP database instance 110 and automatically replicate the data changes to corresponding data objects (e.g., tables, records) in storage database instance 110 when the changes are detected. In these embodiments, database instances 110 and 112 comprise the same data objects, database schema and data, so that at least a portion of instance 112 operates as a replica of instance 110—including storing a copy of the data from instance 110. As explained herein, data from instance 110 is synchronized to instance 112 and then purged from instance 110. Benefits of the synchronization and purge process described herein include (i) full retention in storage database instance 112 of the data processed in OLTP database instance 110 through the synchronization process and (ii) minimizing the size of instance 110 to ensure required speed and performance capabilities are met.

In some embodiments, server computing device 106 can be hosted in a cloud computing environment along with database instance 110 and 112, or server computing device 106 can be located on a separate computing device that is external to the cloud computing environment. In some embodiments, database instances 110 and 112 are hosted in separate regions or zones of the cloud computing environment that utilize discrete, physically separate hardware components (e.g., computing devices, processors, memory modules) and network connections in a particular geographic area.

Each database instance 110 and 112 can comprise metadata associated with the database instance and/or data within the instance. Generally, the metadata can include information relating to the contents of the database instance (e.g., data objects, structure, and relationships), information relating to backend processes or functions that operate to manage the database instance, and information relating to roles, permissions, privileges, and authentication credentials for users of the database instance.

As can be appreciated, circumstances may necessitate that a given database instance (e.g., instance 110) is replicated, transferred, and/or synchronized to another database instance (e.g., instance 112)—e.g., for offloading data, disaster recovery, redundancy, data retention, and/or regulatory compliance requirements. As part of this process, system 100 must ensure that the data resident in database instance 110 is synchronized to database instance 112, so that the data is consistent in each instance 110 and 112 and users can rely on accuracy when performing data operations on the instances 110 and 112. In some embodiments, the data synchronized from database instance 110 to database instance 112 is immutable—meaning that the data cannot be changed or updated by any users who are accessing instance 112. In these embodiments, only an authorized synchronization process configured to transfer the data from instance 110 to instance 112 is able to make changes to the data.

Figure 2:
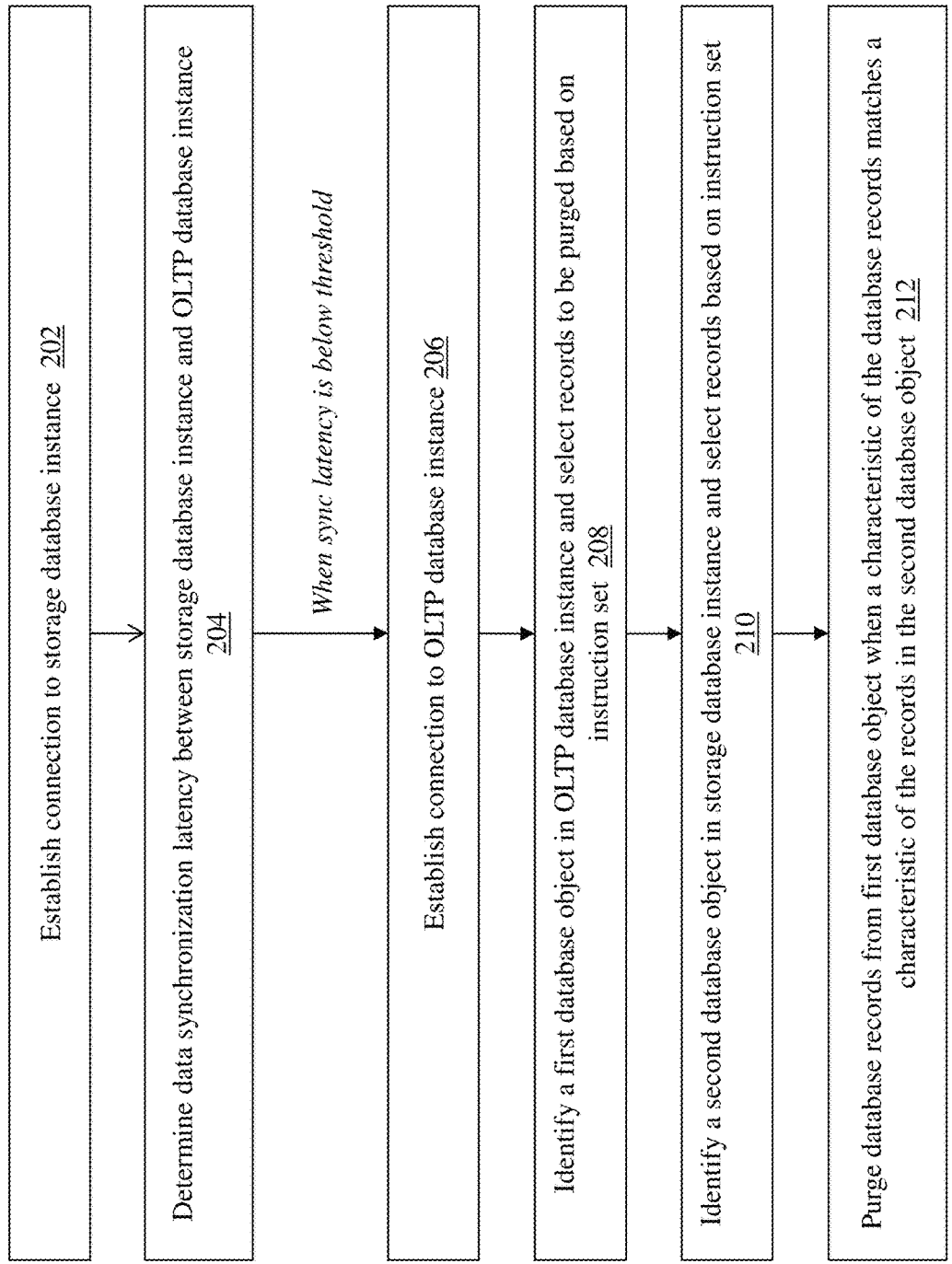
FIG. 2 is a flow diagram of a computerized method of automated latency-aware purging of database records.

FIG. 2 is a flow diagram of a computerized method 200 of automated latency-aware purging of database records, using system 100 of FIG. 1. Server computing device 106 can be configured to initiate the process of automated latency-aware purging of database records automatically according to a predefined schedule. For example, a scheduler thread running on server computing device 106 can trigger the purging process when a timestamp value for the current time matches a scheduled purge time as defined on server computing device 106. In some embodiments, server computing device 106 initiates the database purging process upon receipt of a signal from, e.g., client computing device 102—where a system administrator may decide to start the purging process.

Server computing device 106 establishes (step 202) a connection to storage database instance 112 (e.g., via network 104). In some embodiments, server computing device 106 is configured to establish the connection to storage database instance 112 periodically (e.g., via a scheduled task or process) or in other embodiments, server computing device 106 is configured to establish the connection upon startup and maintain the connection consistently.

Latency monitor 108a of server computing device 106 determines (step 204) a data synchronization latency value between storage database instance 112 and OLTP database instance 110. In this context, the synchronization latency corresponds to an amount of delay between (i) a first time at which data is sent from OLTP database instance 110 and (ii) a second time at which the data is received by storage database instance 112—although other methods for determining synchronization latency can be contemplated within the scope of invention.

As can be appreciated, determination of the synchronization latency between OLTP database instance 110 and storage database instance 112 is important for server computing device 106 to ensure that the data purge process described herein can occur without loss of data. For example, when the synchronization latency is above a predefined value (e.g., one minute), initiation of a data purge process against OLTP database instance 110 could result in data that is newly recorded in instance 110 (e.g., more recently than one minute ago) being purged before that data is synchronized to storage database instance 112.

To avoid this problem, latency monitor 108a continuously records the synchronization latency value corresponding to data transfer between OLTP database instance 110 and storage database instance 112. In some embodiments, latency monitor 108a comprises a software process that monitors a data structure (such as a heartbeat table or tables) which stores data relating to end-to-end replication lag between instance 110 and instance 112. Latency monitor 108a can store data such as information about ongoing synchronization/replication streams between the instances (e.g., a timestamp corresponding to when data is sent from OLTP database instance 110 and a timestamp corresponding to when data is received by storage database instance 112). In some embodiments, when OLTP database instance 110 transmits data for replication to storage database instance 112, the data stream can include the timestamp value. As a result, when storage database instance 112 receives the data stream, storage database instance 112 can record the transmission timestamp from OLTP database instance 110 in a heartbeat table and separately record a receipt timestamp in the heartbeat table. Also in certain embodiments, storage database instance 112 can periodically store the timestamp values in a heartbeat history table so that synchronization latency can be tracked over time.

To determine the synchronization latency value prior to initiating a data purge, latency monitor 108a can retrieve the timestamps recorded in the heartbeat table(s) in storage database instance 112 and determine a difference between a sending timestamp and a receipt timestamp for a given data stream (or for all data streams) between OLTP database instance 110 and storage database instance 112. Once the synchronization latency value is determined, latency monitor 108a can determine whether the latency value is within an acceptable threshold. The latency value is configurable according to one or more performance criteria or user preferences. In certain embodiments, latency monitor 108a is configured with a default threshold value (e.g., one minute). In other embodiments, latency monitor 108a can dynamically determine a threshold value based upon, e.g., predicted or actual transaction activity in OLTP database instance 110, network traffic monitoring statistics, and so forth. For example, if latency monitor 108a detects a slowdown in network 104 that may affect the synchronization of data between instances 110 and 112, monitor 108a can adjust the threshold latency value to compensate.

When latency monitor 108a determines that the synchronization latency is within an acceptable threshold, monitor 108a instructs record selection module 108b to begin the data purge process. Record selection module 108b establishes (step 206) a connection to OLTP database instance 110. Module 108b then identifies (step 208) a first database object in OLTP database instance 110 and selects one or more database records to be purged from the first database object based upon a data purge instruction set. The first database object can be a single table comprising one or more database records (e.g., rows of data), or the first database object can be defined as a set of independent tables, or related tables (e.g., via a primary key-foreign key relationship), that each contain one or more database records.

As mentioned above, module 108b identifies the first database object using a data purge instruction set. In some embodiments, the data purge instruction set comprises programmatic instructions generated by record selection module 108b that, when executed, operate to identify database object(s) in instance 110, and select and purge specific database records from instance 110. Module 108b can generate the data purge instruction set using one or more data elements as received from client computing device 102 and/or as stored in server computing device 106. For example, module 108b can receive input from a user of client computing device 102 relating to the particular database object(s) and/or database record(s) to be purged. In some embodiments, the input received by module 108b from client computing device 102 can comprise a structured file (e.g., XML, CSV) generated by a user interface of client computing device 102 based upon input provided by the user into one or more fields of the user interface. The structured file can include identification of the database object(s) in OLTP database instance 110 from which data is purged and optionally one or more attributes or constraints relating to the database records to be purged.

Figure 3:
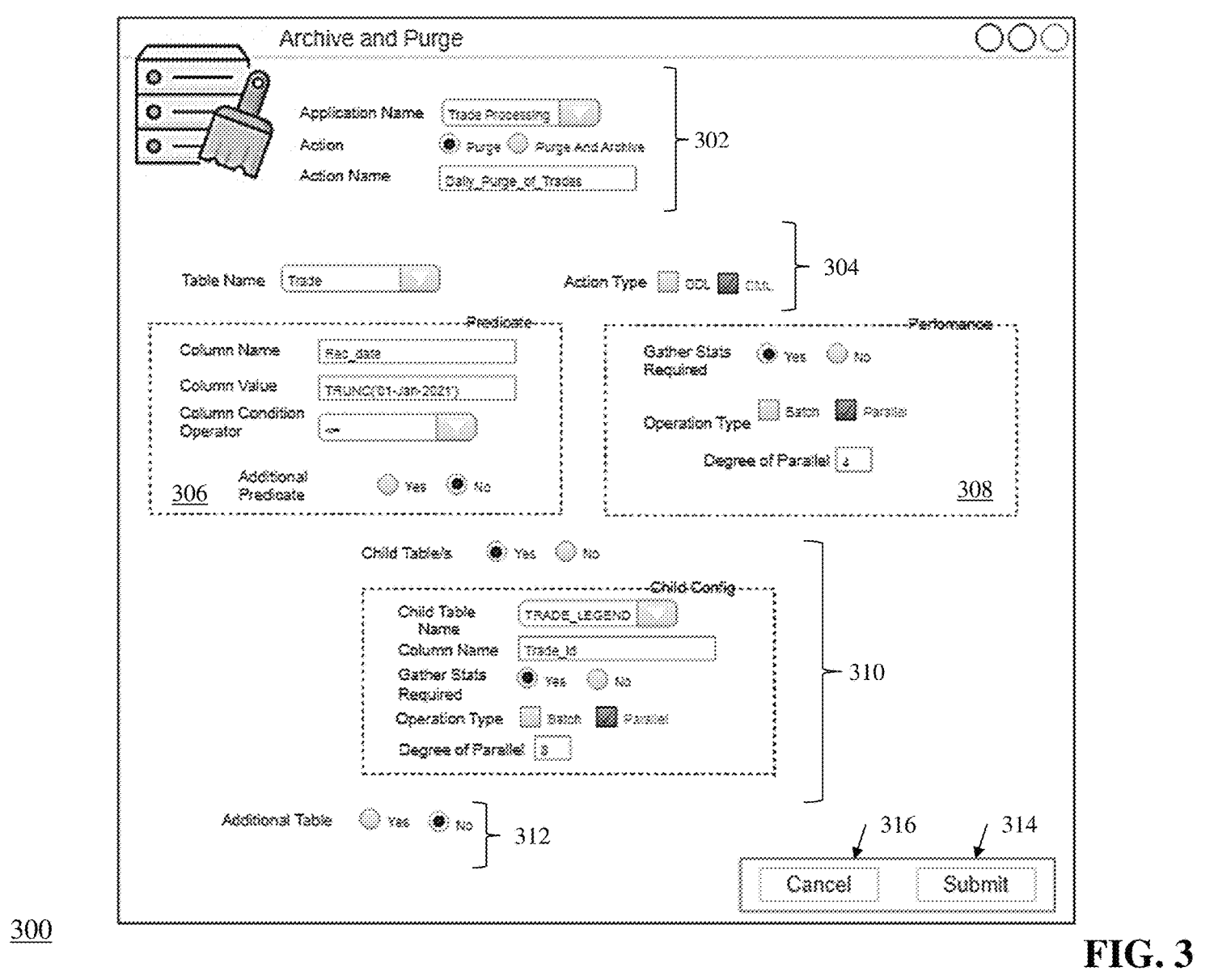

FIG. 3 is a diagram of an exemplary user interface 300 displayed to a user of client computing device 102 for entry of input for generation of a data purge instruction set. As shown in FIG. 3, user interface 300 includes a plurality of input fields (e.g., drop down menus, radio buttons, checkboxes, text input fields, etc.) that enable the user to define a specific data purge process. Section 302 of user interface 300 enables a user to select an application ("Trade Processing") that manages or controls the data to be purged, choose whether the data will be purged only or purged and archived (e.g., in a separate database), and provide a name for the purge action ("Daily Purge of Trades").

Section 304 of interface 300 enables the user to select a database object (e.g., "Trade" table) from which records will be purged, and purge action type (e.g., Data Definition Language (DDL) or Data Manipulation Language (DML)).

Section 306 of interface 300 allows the user to specify a particular column or columns of the database object upon which the data purge is predicated. In other words, the user can define one or more attributes or criteria to be applied to the database records to select only the records that are intended to be purged. For example, as shown in FIG. 3, section 306 enables the user to select a specific column name ("Rec date") in the database object, enter a column value ("TRUNC('1 Jan. 2021')") against which the actual values in the column will be compared, and a column condition operator ("<="). Using this data as an example, module 108b generates a data purge instruction set that includes an instruction to select for purging only the data records from the Trade table where the value in the Rec Date column is less than or equal to Jan. 1, 2021. The user can also enter additional predicates using the radio button in section 306.

Section 308 of interface 300 enables the user to define particular performance attributes for the purge process, including whether statistics of the purge process/purged data should be gathered, the purge operation type ("Batch" or "Parallel"), and if Parallel is selected, the degree of parallel purging. In some embodiments, the performance attributes are configurable. Based on the volume of data and resource availability, the user can adjust the purge process DMLs to run in Parallel or Batch Commit (Single DML commit after specific interval). An objective of the configuration parameter tuning is to optimize the execution and efficiency of the purge process.

Section 310 of interface 300 provides for configuration of purging for child table(s) that are related to the table ("Trade") selected above in section 304. As can be appreciated, in some databases one or more objects are related to each other—a classic example is a relational database where one database table is linked to another database table through a defined relationship between a field in each table (e.g., primary key-foreign key relationship). To maintain data integrity, the user can ensure that not only the data in the parent database object is purged, but also related data in any child table(s) is similarly purged. As shown in FIG. 3, section 310 enables the user to select whether one or more child tables should be purged (via the "Child Table/s" radio button), and if so, the user can select the Child Table Name via a drop-down box, then identify purge attributes such as Column Name, Gather Stats Required, Operation Type, and Degree of Parallel.

The user can further select additional tables for purging using radio button 312. If selected, user interface 300 can display a similar interface to enable the user to provide input for a new table—including all the fields described above. Once the user has defined the purge process using interface 300, the user can select the Submit button 314 to transmit the purge information to record selection module 108b for generation of the data purge instruction set. The user can alternatively select the Cancel button 316 and the purge process will not be initiated. In some embodiments, record selection module 108b can store the input received from client computing device 102 and/or the data purge instruction set generated from the input in local storage so that the data can be used for subsequent purges.

Turning back to FIG. 2, after generating the data purge instruction set as described above, record selection module 108b selects database records from the database object(s) (e.g., table(s)) according to the data purge instruction set. In some embodiments, record selection module 108b stores a count of the selected records from each table in OLTP database 110 to be purged. Record selection module 108b then identifies (step 210) a second database object in storage database instance 112 that corresponds to the first database object in OLTP database 110. Module 108b selects database records in the second database object based upon the data purge instruction set. In some embodiments, module 106b stores a count of the selected database records in the second database object. For example, module 108b identifies one or more database tables (e.g., table "Trade") in storage database instance 112 that correspond to the tables identified in the data purge instruction set and selects database record(s) using criteria defined in the data purge instruction set (e.g., predicates), which can be defined as a configuration object in a database. As can be appreciated, in some embodiments module 108b can dynamically determine the count of the database tables using one or more selection criteria as above. These steps are performed to ensure that the database records to be purged from OLTP database instance 110 exist in corresponding database object(s) in storage database instance 112 prior to purging the records from OLTP database instance 110. In some embodiments, after selecting the database records to be purged from OLTP database instance 110 and selecting the database records from storage database instance 112 using the data purge instruction set, module 108b compares the record counts of each selection. When the record count of the records to be purged from OLTP database instance 110 matches the record count of the records in storage database instance 112, record selection module 108b can confirm that the data is synchronized between the two instances 110 and 112—thereby ensuring that the data can be purged from instance 110 without the risk of data loss. If the record counts do not match, it likely indicates that the data is not synchronized between instances 110 and 112, and module 108b can abort the data purge process without deleting any records from instance 110.

Record selection module 108b transmits the data purge instruction set to purge execution module 108c of server computing device 106. Purge execution module 108c purges (212) database records from first database object when a characteristic of the database records selected in the first database object matches a characteristic of the database records selected in the second database object. In some embodiments, the characteristic is the aforementioned record count—e.g., when a count of the database records selected in OLTP database instance 110 matches the count of the database records selected in storage database instance 112. It should be appreciated that module 108c can utilize other characteristics in addition to, or instead of, the record count in order to initiate the data purge.

Purge execution module 108c then executes the data purge process against OLTP database instance 110 using the criteria defined in the data purge instruction set—i.e., selecting and deleting specific database records from defined database object(s) using a purge process configured with, e.g., performance attributes from the instruction set. In executing the data purge process, module 108c executes one or more database commands against OLTP database instance 110 to delete the appropriate records. When the records have been purged from instance 110, module 108c ends the data purge process. In some embodiments, module 108c transmits a notification message to one or more remote computing devices (such as client computing device 102) to indicate that the purge process is complete. In some embodiments, module 108c can perform an archival process in addition to, or instead of, the purge process—whereby module 108c can store the specific database records that are identified for purging in an archive database or repository prior to purging them from OLTP database instance 110.

Figure 4:
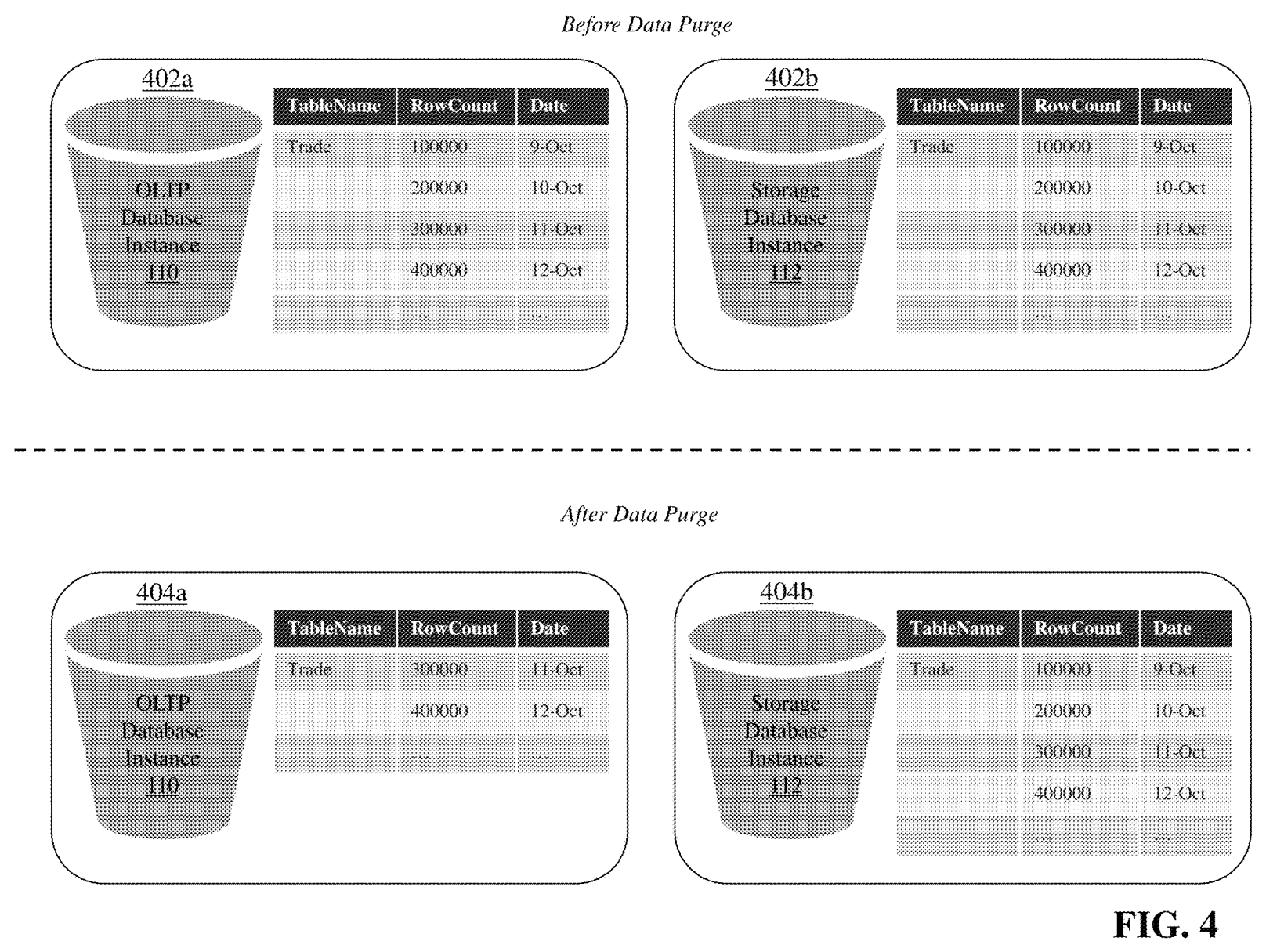

FIG. 4 is a diagram of database instances 110 and 112 before and after the data purge process described herein. The top portion of FIG. 4 shows database instances 110 and 112 prior to the data purge process. Grid 402a comprises data about the records stored in Trade table in OLTP database instance 110 (e.g., RowCount, Date), while grid 402b comprises similar data about the records stored in Trade table in storage database instance 112. As can be appreciated, the row counts for each date match between grid 402a and grid 402b—indicating that the data in the Trade table in each database instance 110 and 112 also matches. Then, a data purge process as described herein is executed against OLTP database instance 110, including purging records from Trade table that are older than October 11. Because the data in the Trade table matches between the database instances 110 and 112, system 100 initiates the data purge process to delete records from instance 110.

The bottom portion of FIG. 4 shows database instances 110 and 112 after the data purge process. As shown, grid 404a indicates that data records prior to October 11 have been purged from the Trade table in OLTP database instance 110. However, the corresponding database records in the Trade table in storage database instance 112 are retained—thereby serving as a repository for archived/replicated data from OLTP database instance 110.

Additionally, in some embodiments purge execution module 108c can be configured to perform logging and monitoring of data associated with the purge process described herein, in order to provide the data to one or more remote computing devices for, e.g., statistical analysis by system administrators and/or database personnel. It should be appreciated that the logging and monitoring data can be analyzed for automated insight into the technical operation and outcomes associated with the purge process, which enables system support staff to perform continuous operational improvement of the process through configuration and adjustment of the process.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for automated, latency-aware purging of database records, the system comprising a server computing device having a memory for storing computer-executable instructions and a processor that executes the computer-executable instructions to:
    establish a connection to a storage database instance;
    determine a data synchronization latency value between the storage database instance and an online transaction processing (OLTP) database instance coupled to the storage database instance;
    when the data synchronization latency value is below a predetermined threshold value:
    establish a connection to the OLTP database instance;
    identify a first database object in the OLTP database instance and select database records to be purged from the first database object based upon a data purge instruction set;
    identify a second database object in the storage database instance that corresponds to the first database object and select database records in the second database object based upon the data purge instruction set;
    purge the database records from the first database object in the OLTP database instance when a characteristic of the database records to be purged from the first database object matches a characteristic of the database records selected in the second database object.

2. The system of claim 1, wherein when the data synchronization latency value is above the predetermined threshold, the server computing device closes the connection to storage database instance and transmits a notification to a remote computing device.

3. The system of claim 1, wherein the OLTP database instance and the storage database instance comprise instances of the same database.

4. The system of claim 3, wherein the first database object comprises a first table and the database records to be purged from the first database object comprise rows in the first table.

5. The system of claim 4, wherein the second database object compromises a second table that corresponds to the first table and the database records in the second database object comprise rows in the second table.

6. The system of claim 1, wherein the data purge instruction set comprises an identifier of the first database object and one or more conditions that define the rows in the first database object to be purged.

7. The system of claim 6, wherein the characteristic of the database records to be purged from the first database object comprises a count of the database records to be purged.

8. The system of claim 7, wherein the count of the database records to be purged from the first database object is dynamically established based upon one or more selection criteria as defined in a configuration object.

9. The system of claim 6, wherein the characteristic of the database records selected in the second database object comprises a count of the database records to be purged.

10. The system of claim 9, wherein the count of the database records to be purged from the second database object is dynamically established based upon one or more selection criteria as defined in a configuration object.

11. The system of claim 1, wherein purging the database records from the first database object in the OLTP database instance comprises executing a database script that deletes from the first database object the database records to be purged.

12. The system of claim 1, wherein the data synchronization latency value relates to a time delay between a first time at which a database record is written to the OLTP database instance and a second time at which a matching database record is written to the storage database instance.

13. The system of claim 12, wherein the threshold value is one minute.

14. A computerized method of automated, latency-aware purging of database records, the method comprising:
    establishing, by a server computing device, a connection to a storage database instance;
    determining, by the server computing device, a data synchronization latency value between the storage database instance and an online transaction processing (OLTP) database instance coupled to the storage database instance;
    when the data synchronization latency value is below a predetermined threshold value:
    establishing, by the server computing device, a connection to the OLTP database instance;
    identifying, by the server computing device, a first database object in the OLTP database instance and selecting database records to be purged from the first database object based upon a data purge instruction set;
    identifying, by the server computing device, a second database object in the storage database instance that corresponds to the first database object and selecting database records in the second database object based upon the data purge instruction set;
    purging, by the server computing device, the database records from the first database object in the OLTP database instance when a characteristic of the database records to be purged from the first database object matches a characteristic of the database records selected in the second database object.

15. The method of claim 14, wherein when the data synchronization latency value is above the predetermined threshold, the server computing device closes the connection to storage database instance and transmits a notification to a remote computing device.

16. The method of claim 14, wherein the OLTP database instance and the storage database instance comprise instances of the same database.

17. The method of claim 16, wherein the first database object comprises a first table and the database records to be purged from the first database object comprise rows in the first table.

18. The method of claim 17, wherein the second database object compromises a second table that corresponds to the first table and the database records in the second database object comprise rows in the second table.

19. The method of claim 14, wherein the data purge instruction set comprises an identifier of the first database object and one or more conditions that define the rows in the first database object to be purged.

20. The method of claim 19, wherein the characteristic of the database records to be purged from the first database object comprises a count of the database records to be purged.

21. The method of claim 20, wherein the count of the database records to be purged from the first database object is dynamically established based upon one or more selection criteria as defined in a configuration object.

22. The method of claim 19, wherein the characteristic of the database records selected in the second database object comprises a count of the database records to be purged.

23. The method of claim 22, wherein the count of the database records to be purged from the second database object is dynamically established based upon one or more selection criteria as defined in a configuration object.

24. The method of claim 14, wherein purging the database records from the first database object in the OLTP database instance comprises executing a database script that deletes from the first database object the database records to be purged.

25. The method of claim 14, wherein the data synchronization latency value relates to a time delay between a first time at which a database record is written to the OLTP database instance and a second time at which a matching database record is written to the storage database instance.

26. The method of claim 25, wherein the threshold value is one minute.

\* \* \* \* \*